Sept. 17, 1935.                 R. HOE                    2,014,734
                             SPLASH GUARD
                          Filed Dec. 4, 1933            3 Sheets-Sheet 1
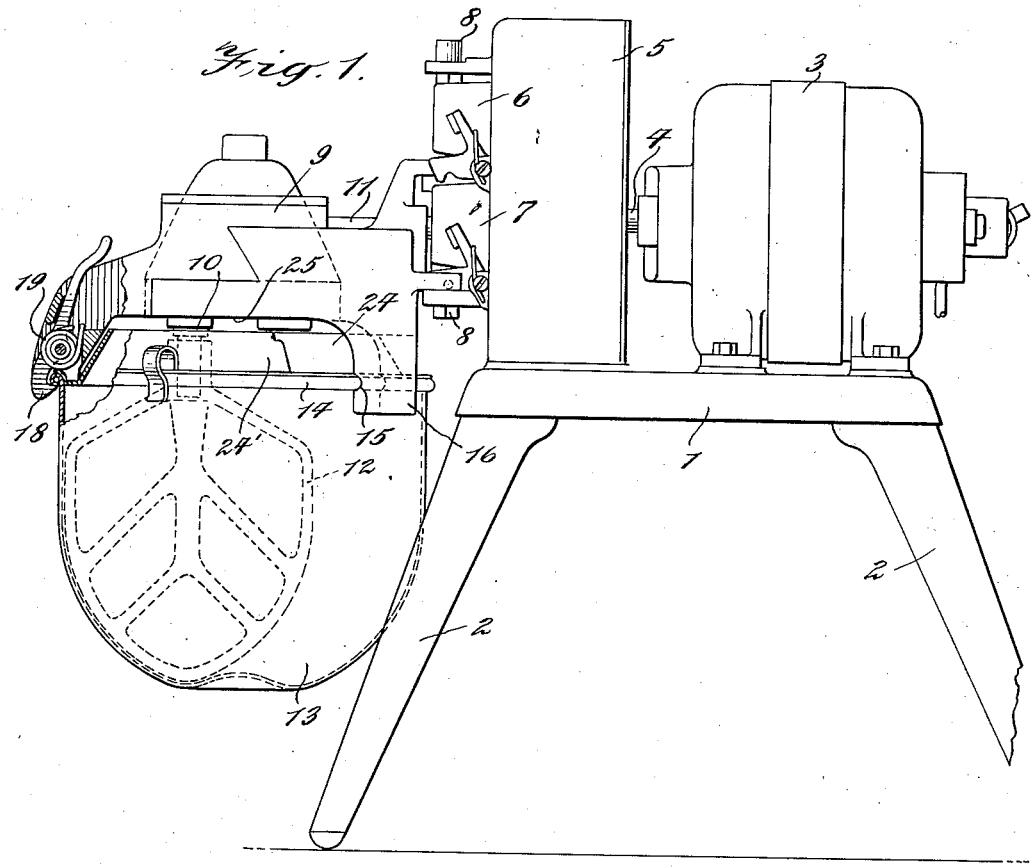
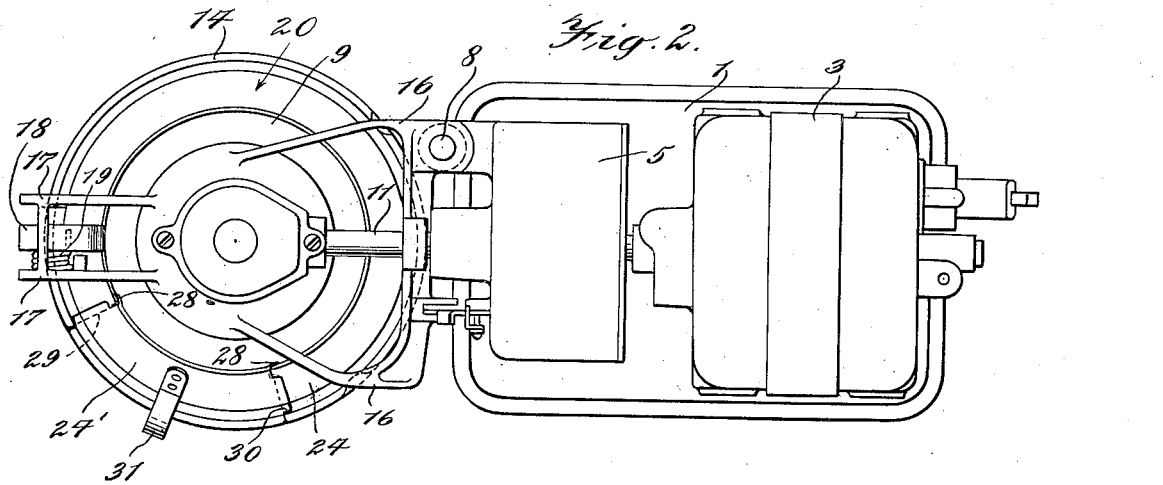

Sept. 17, 1935.   R. HOE   2,014,734
SPLASH GUARD
Filed Dec. 4, 1933   3 Sheets-Sheet 2
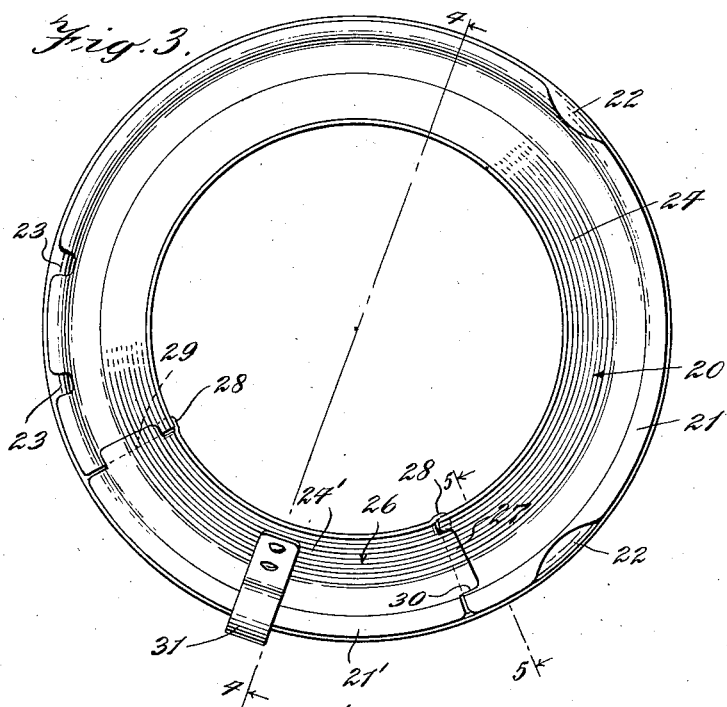
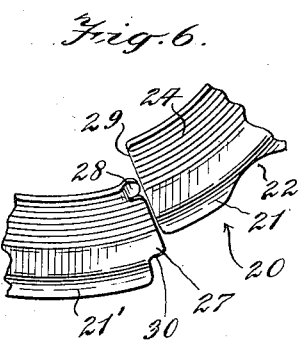
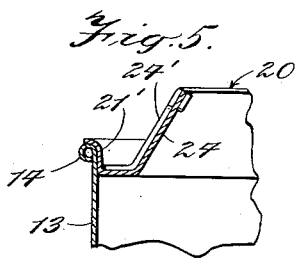
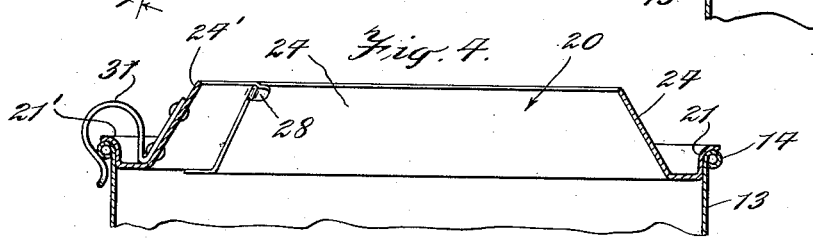
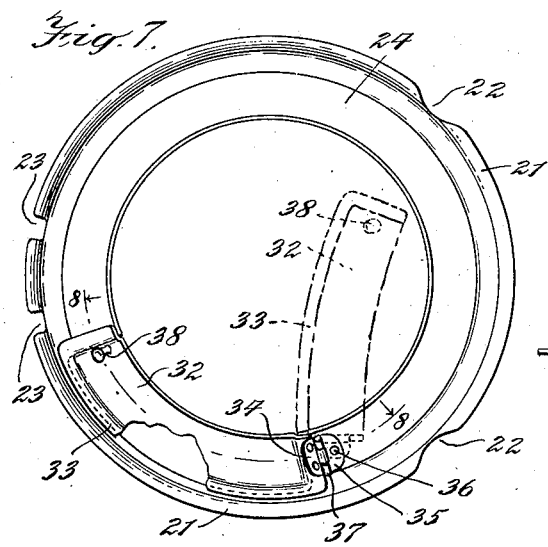
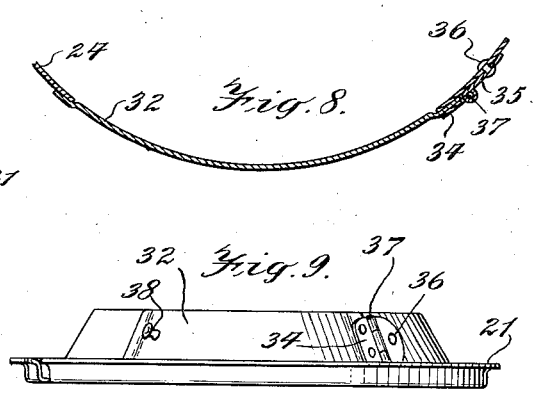
INVENTOR
Robert Hoe
BY
Gifford, Scull & Burgess
ATTORNEYS.

Sept. 17, 1935.   R. HOE   2,014,734
SPLASH GUARD
Filed Dec. 4, 1933   3 Sheets-Sheet 3
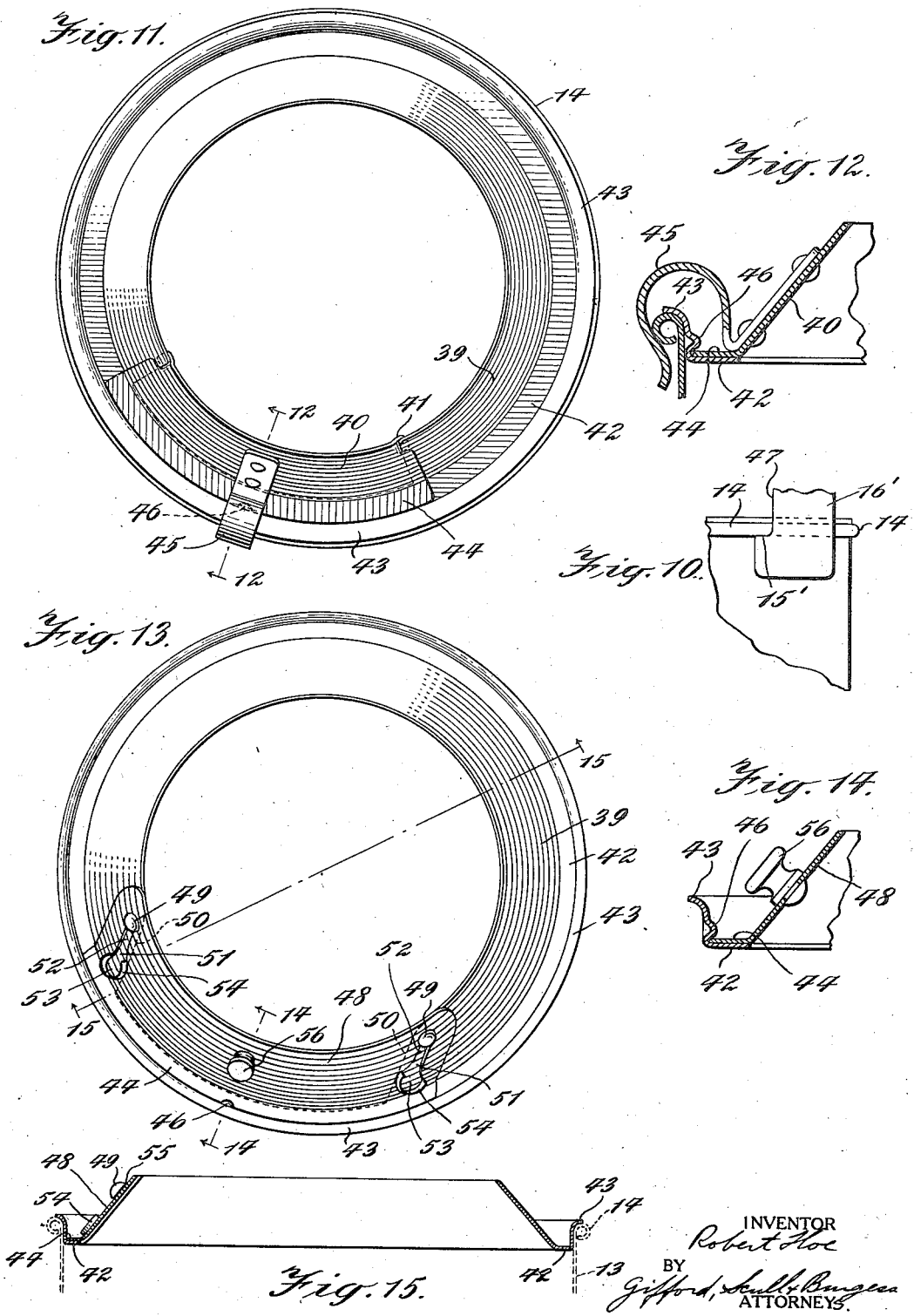

Patented Sept. 17, 1935

2,014,734

UNITED STATES PATENT OFFICE 2,014,734

SPLASH GUARD

Robert Hoe, Hyde Park, N. Y.

Application December 4, 1933, Serial No. 701,060

14 Claims. (Cl. 259—1)

This application is a continuation in part of my copending application Ser. No. 534,912, filed May 4, 1931.

The invention relates to a novel and improved splash guard, particularly adapted for use in connection with a container for holding material to be beaten in the preparation of food. The novel features will be best understood from the following description and the annexed drawings, in which:

Fig. 1 is a vertical elevation of a power unit having the invention applied thereto, parts being broken away and shown in section;

Fig. 2 is a plan view of the arrangement appearing in Fig. 1;

Fig. 3 is a view of one form of guard detached from the other apparatus appearing in Figs. 1 and 2;

Fig. 4 is a section on the line 4—4 of Fig. 3;

Fig. 5 is a section on the line 5—5 of Fig. 3;

Fig. 6 is a fragmentary view of part of the structure appearing in Fig. 3, but showing the parts detached;

Fig. 7 is a view corresponding to Fig. 3, but showing a different embodiment of the invention;

Fig. 8 is a section on the line 8—8 of Fig. 7;

Fig. 9 is a side elevation of the structure appearing in Fig. 7;

Fig. 10 is a fragmentary view of a part of the structure similar to that appearing in Fig. 1, but showing a different form thereof;

Fig. 11 is a view similar to Fig. 3 but showing a still further embodiment of the invention;

Fig. 12 is a section on the line 12—12 of Fig. 11;

Figs. 13 and 14 are views corresponding to Figs. 11 and 12 but showing a still further embodiment of the invention, Fig. 14 being a section taken on the line 14—14 of Fig. 13;

Fig. 15 is a section taken on the line 15—15 of Fig. 13.

Referring first to Figs. 1 and 2, I have shown the invention as used in connection with a power unit comprising a beater head supporting a container in the manner described and claimed in my application Ser. No. 492,401, Pat. No. 1,910,162. Such an arrangement comprises a base 1 supported by legs 2 and carrying a motor 3 which, through a shaft 4, operates gearing in a casing 5, which gearing in turn operates a shaft at either one of the outlets 6 or 7. Associated with these outlets are hinges comprising pins 8 and adapted to support a head 9. This head has planetary gearing adapted to operate a beater shaft 10, and this gearing in turn is operated from one of the outlets 6 or 7 by means of a shaft 11 which is clutched to one of the outlets. Such an arrangement is exemplary of any suitable one which may be used to operate a beater 12 carried on the shaft 10 and depending into a container 13.

In the form shown, the container has a rim 14 which is supported in grooves 15 in two ears 16 disposed adjacent the casing 5. The grooves 15 open horizontally, as is evident and as is more fully described in my aforesaid patent.

Opposite the ears 16 are depending ears 17 having a groove opening downwardly to receive the rim 14, and between these ears is a spring-pressed latch 18 operated by a spring 19 to snap into engagement with the rim of the container.

All of the above described arrangement for supporting the container is more fully described and claimed in my aforesaid patent.

In the operation of the above described apparatus, the beater is operated when the motor is turned on, and will rotate both on the axis of its shaft 10 and also will be given a planetary movement in a manner well known in the art. In order to avoid splashing of material from the container, I have provided a guard designated generally 20 in Figs. 1 to 6, inclusive. In these figures, I have shown the guard as provided with a rim 21 adapted to engage the rim 14 on the container, and also to extend slightly within the wall of the container so as to be held against lateral displacement when in position.

The rim 21 is provided with recesses 22 to receive the ears 16, and with recesses 23 to receive the ears 17. In this way, the guard is properly positioned so that a certain portion thereof will always be disposed between one of the ears 16 and one of the ears 17. I make the guard in sections, two being here illustrated, and I make one section removable with respect to the other and preferably locate the removable section at this place which will always come between one ear 16 and one ear 17. In other words, I place this removable section between one of the recesses 22 and one of the recesses 23, as best shown in Fig. 3.

The guard is generally circular in plan view, and may conveniently be made conical in section, as shown in Fig. 4. The wall 24 of the conical portion extends upwardly to a point adjacent the bottom 25 of the beater head, so that the container is practically closed by the wall 24 and the head, and so that the head prevents removal of the guard. It is often desirable, when beating material in the preparation of food, to inspect the contents of the container and possibly add further material. In order to give convenient access to the container, I make the splash guard in sections, as noted above, with a removable section located between one recess 22 and one recess 23. This removable section is preferably provided with a rim 21' forming a continuation of the rim 21, while within the rim it overlaps the adjacent wall 24, having portions on both sides of said wall. Thus, in the embodiment shown in Figs. 3, 4, 5, and 6, the section 26 has a relatively wide lip 27 engaging the upper or outer surface of the wall 24 of the stationary section, and also having a lip 28 bent downwardly so as to engage the under surface of the wall 24. Of course, the removable section has a wall 24' forming a substantial continuation of the wall 24, except that it is in a slightly different plane. The guard is made preferably of sheet material throughout, so that the above construction can be easily made.

The section 26 may be put in place and removed with ease. When it is desired to put it in position, all that is necessary is to move it radially inwardly until the lips 28 engage beneath the radially extending edges 29 of the wall 24. The lips 27 are then dropped down until they engage the upper surface of the wall 24, and then it will be noted that the edges 30 of the wall 24' will engage against the rim 21, so that the removable section is held in position. When it is to be removed, all that is necessary is to lift the rim 21' until such time as the edges 30 clear the rim 21, and then the section may be moved outwardly until the lips 28 clear the edges 29. The stationary section is held in place by the head, as noted above.

I preferably provide the section 26 with a handle 31, here shown as riveted in place, and this handle may be used to lift the entire guard. It will be evident that the weight of the other section will cause it to pivot on the lips 28 so as to bring the outer portion of the wall 24 up under and in contact with the lower surface of the lips 27 so that the handle may be used to carry the guard around.

In Figs. 7, 8, and 9, I have shown a different embodiment. The relatively stationary section of the guard corresponds in all particulars to the same part of the embodiment just described, and similar numerals have been used to designate similar parts. A detailed description of this section will, therefore, not be given. In this form, however, the removable section 32 is hinged to the stationary section, and is provided with a rim 33 adapted to be received within the rim 21 which, in this form, is a continuous one. The hinge is shown as formed of two leaves, one leaf 34 being rigidly secured to the section 32 as by two or more rivets, as indicated, while the other leaf 35 is secured to the wall 24 by a pivot, here shown as a single rivet 36.

When in the position shown in Fig. 9, and in full lines in Fig. 7, radial outward movement of the section 32 is prevented because of the engagement between the rim 33 and the rim 21. However, when the section is pivoted on the rivet 36 to the position shown in dot and dash lines in Fig. 7, or to any other position where the rims 21 and 33 will clear each other, then the section may be swung outwardly on the hinge pintle 37 in the usual way. A suitable knob 38 is provided for use in manipulating the movable section.

Referring now to Figs. 11 and 12, I have shown therein a different embodiment of the invention, in which the stationary section 39 is provided with an upwardly extending conical wall as before, and in which the removable section 40 has ears 41 corresponding to the ears 28 previously described in connection with Figs. 3 and 6. In this embodiment, however, the stationary section 39 has a peripheral portion 42 which forms a continuous ring. This peripheral portion is shown as flat and disposed below the level of the rim 43 of the guard.

The removable section 40 is provided with a horizontally extending skirt 44 adapted to rest upon the peripheral portion 42, as best shown in Fig. 12. I also provide a handle 45 by means of which the removable portion may be handled and which also permits lifting of the entire splash guard.

In order still further to prevent displacement of the section 40, I provide a projection 46 (Fig. 12) upon the rim 43 and extending inwardly so as to overlie the skirt 44. This effectively prevents vertical displacement of the section 40, as by particles of the matter being beaten in the container flying upwardly and striking this section. The projection 46 is preferably so arranged that it holds the skirt 44 in relatively close contact with the peripheral portion 42 and thus provides a joint at this point which is sufficiently tight to prevent escape of any matter which may splash upwardly against the guard. The continuous peripheral portion, which includes the rim 43, prevents radial outward movement of the detachable or removable section.

In Fig. 10 I have indicated an ear 16' corresponding generally to the ear 16 shown in Fig. 1. Here, however, I have shown that the groove 15' is in the form of a shelf, the wall of the ear extending vertically upwardly, as indicated at 47 in Fig. 10, so as to permit free vertical movement of the rim 14 of the container. By this arrangement it is possible to eliminate the recesses 22 and 23 shown in the other embodiments, if desired.

Referring now to Figs. 13, 14, and 15, I have shown therein a slightly different embodiment in which the section 39 is likewise provided with the continuous peripheral portion and continuous rim 43 as in the embodiment of Figs. 11 and 12. The movable section 48, however, is shown of slightly different form and is held in position by means of headed studs 49 disposed upon the section 39 adjacent the edges 50 thereof and engaged in keyhole slots 51 in the section 48. It will of course be understood that the head of each stud is larger than its shank, the shank being of some such dimension as will permit it to slide readily in the portion 52 of a keyhole slot, and the diameter of the head being such that it may be moved through the enlarged end 53 of the same slot. In order to prevent any possibility of the head of the stud catching as the section 48 is removed, the portion 53 of each slot is surrounded by a wall 54 extending upwardly therefrom and providing a smooth surfaced wall with which the edge of the studded head engages. As seen in Fig. 15, this wall extends upwardly from the surface of the section 48 sufficiently to engage the edge 55 of the head on the stud.

In the embodiment being described, the section 48 is held against vertical movement by means of a projection 46 as previously described, and is provided with a suitable knob 56 by which the section 48 may be lifted either alone, to disconnect it from the section 39, or with the section 39.

While I have shown the invention as embodied in specific forms, it is to be understood that various changes in details may be made without departing from the scope of the invention, and I therefore do not intend to limit myself except by the appended claims.

I claim:

1. In combination, a mechanism including a beater and a shaft to rotate it, a container for material to be operated upon by the beater, means for supporting the container in operative relation to the mechanism, a guard partially closing the container and surrounding the axis of rotation of the shaft, said guard being formed in sections, means preventing removal of one of said sections when the container is in said operative position, said other section being removable with respect to the other to give access to the container, said removable section having portions overlapping the first section and on opposite sides thereof, and means preventing movement of the removable section in the plane of the first section.

2. A splash guard for a container, said guard being formed of sheet material and having an upwardly extending rim adapted to engage the inside of the rim of the container, the guard also being formed in sections, with one section movable with respect to the other and overlying it and disposed within and in engagement with the rim on said other section, whereby outward movement of the movable section is prevented.

3. A splash guard for a container, said guard being formed of sheet material and having an upwardly extending rim adapted to engage the inside of the rim of the container, the guard also being formed in sections, with one section movable with respect to the other and overlying it and disposed within and in engagement with the rim on said other section, whereby outward movement of the movable section is prevented, and ears on said first-named section bent under the other section.

4. A splash guard for a container, said guard being formed of sheet material and having an upwardly extending rim adapted to engage the rim of the container, the guard also being formed in sections, with one section overlying the other and disposed within the rim on the other section, whereby outward movement of the first-named section is prevented, and ears on said first-named section bent under the other section, said other section having radially extending edges beneath which said ears are disposed.

5. A splash guard for a container having a horizontally disposed rim, said guard being formed of sheet material and having a continuous peripheral portion adapted to engage the rim of the container and also having a large central opening surrounded by a narrow wall formed in two sections, each section extending from the opening to the peripheral portion, one section being integral with said peripheral portion and the other detachable therefrom, and means detachably holding said sections together.

6. A splash guard for a container having a horizontally disposed rim, said guard being formed of sheet material and having a continuous peripheral portion adapted to engage the rim of the container and also having a large central opening surrounded by a narrow wall formed in two sections, each section extending from the opening to the peripheral portion, one section being integral with said peripheral portion and the other detachable therefrom, and means preventing relative vertical movement between said sections.

7. A splash guard for a container having a horizontally disposed rim, said guard being formed of sheet material and having a continuous peripheral portion adapted to engage the rim of the container and also having a large central opening surrounded by a narrow wall formed in two sections, each section extending from the opening to the peripheral portion, one section being integral with said peripheral portion and the other detachable therefrom and overlying said peripheral portion, and overlapping elements on said detachable section and said peripheral portion preventing relative vertical movement therebetween.

8. A splash guard for a container having a horizontally disposed rim, said guard being formed of sheet material and having a continuous peripheral portion adapted to engage the rim of the container and also having a large central opening surrounded by a narrow wall formed in two sections, each section extending from the opening to the peripheral portion, one section being integral with said peripheral portion and the other detachable therefrom, and overlapping elements on said sections preventing relative vertical movement therebetween.

9. A splash guard for a container having a horizontally disposed rim, said guard being formed of sheet material and having a continuous peripheral portion adapted to engage the rim of the container and also having a large central opening surrounded by a narrow wall, said wall being formed in two sections, each extending from the opening to the peripheral portion, one section being integral with said peripheral portion and the other detachable therefrom, and headed studs on said integral section received in parallel keyhole slots in said detachable section and extending inwardly towards said opening.

10. A splash guard for a container having a horizontally disposed rim, said guard being formed of sheet material and having a continuous peripheral portion adapted to engage the rim of the container and also having a large central opening surrounded by a wall extending between the opening and the peripheral portion, said wall being formed in sections with one section integral with said peripheral portion and the other detachable therefrom and overlying said peripheral portion, overlapping elements on said detachable section and said peripheral portion preventing relative vertical movement therebetween, and means detachably holding said sections together.

11. A splash guard for a container having a horizontally disposed rim, said guard being formed of sheet material and having a continuous peripheral portion adapted to engage the rim of the container and also having a large central opening surrounded by a wall extending between the opening and the peripheral portion, said wall being formed in sections with one section integral with said peripheral portion and the other detachable therefrom and overlying said peripheral portion, overlapping elements on said detachable section and said peripheral portion preventing relative vertical movement therebetween, and headed studs on said integral section received in keyhole slots in said detachable section.

12. A splash guard for a container, said guard being formed of sheet material and having an upwardly extending rim adapted to engage the inside of the rim of the container, the guard also being formed in sections, with one section movable with respect to the other and having parts overlying it, said parts being disposed within and in engagement with the rim on said other section, whereby outward movement of the movable section is prevented.

13. A splash guard for a container having a horizontally disposed rim, said guard being formed of sheet material and having a peripheral portion adapted to engage the rim of the container and also having a large central opening surrounded by a narrow wall formed in two sections, each section extending from the opening to said peripheral portion, and means detachably holding said sections together.

14. A splash guard for a container having a horizontally disposed rim, said guard being formed of sheet material and having a peripheral portion adapted to engage the rim of the container and also having a large central opening surrounded by a narrow wall formed in two sections, each section extending from the opening to said peripheral portion, and overlapping elements carried by said sections and detachably holding them together.

ROBERT HOE.